(12) United States Patent
Kleemann et al.

(10) Patent No.: US 11,399,663 B2
(45) Date of Patent: Aug. 2, 2022

(54) KITCHEN APPLIANCE AND ACCESSORY ELEMENT FOR SEALING A PROTECTIVE HOOD OF A KITCHEN APPLIANCE

(71) Applicant: DE'LONGHI BRAUN HOUSEHOLD GMBH, Neu-Isenburg (DE)

(72) Inventors: Christof Kleemann, Bad Homburg (DE); Thomas Heilig, Frankfurt am Main (DE); Pascal Wohlfahrt, Aschaffenburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

(21) Appl. No.: 17/594,560

(22) PCT Filed: Apr. 22, 2020

(86) PCT No.: PCT/EP2020/061153
§ 371 (c)(1),
(2) Date: Oct. 22, 2021

(87) PCT Pub. No.: WO2020/216767
PCT Pub. Date: Oct. 29, 2020

(65) Prior Publication Data
US 2022/0202251 A1  Jun. 30, 2022

(30) Foreign Application Priority Data
Apr. 26, 2019  (DE) ............... 10 2019 206 029.3

(51) Int. Cl.
*A47J 43/044* (2006.01)
*A47J 43/07* (2006.01)

(52) U.S. Cl.
CPC .......... *A47J 43/0711* (2013.01); *A47J 43/044* (2013.01); *A47J 2043/04427* (2013.01)

(58) Field of Classification Search
CPC .......... A47J 2043/04427; A47J 43/0711; A47J 43/044
(Continued)

(56) References Cited

U.S. PATENT DOCUMENTS

| 4,850,699 A | * | 7/1989 | Rebordosa | ............ A47J 43/082 366/279 |
| 5,360,170 A | * | 11/1994 | Cartellone | .......... A47J 43/0705 241/282.1 |

(Continued)

FOREIGN PATENT DOCUMENTS

| EP | 1625819 A1 | 2/2006 |
| WO | 2010122285 A2 | 10/2010 |
| WO | 2013097702 A1 | 7/2013 |

OTHER PUBLICATIONS

English Translation of International Search Report with Written Opinion of the International Searching Authority, dated Jul. 20, 2020, with respect to International Application No. PCT/EP2020/061153.
(Continued)

*Primary Examiner* — David L Sorkin
(74) *Attorney, Agent, or Firm* — Scott R. Cox (57) ABSTRACT

A kitchen appliance for food processing, which has a drive shaft, a working part, preferably having a blade, which is provided on the drive shaft, a protective hood having multiple cut-outs in the circumferential direction, which protective hood surrounds the working part and has an opening in the axial direction of the drive shaft, and a preferably cylindrical accessory element. The accessory element has an outer body having a first axial end face and a second, opposite axial end face, and the protective hood, by cooperation with the accessory element, defines a cavity for processing foods which is closed in the circumferential direction of the protective hood. The outer body further has
(Continued)

multiple, protrusions projecting inwards in the radial direction, which protrusions can be operatively connected to the cut-outs in the protective hood.

14 Claims, 3 Drawing Sheets

(58) Field of Classification Search
USPC .......................................................... 366/129
See application file for complete search history.

(56) References Cited

U.S. PATENT DOCUMENTS

| | | | |
|---|---|---|---|
| 5,368,384 A * | 11/1994 | Duncan | A47J 43/0705 366/601 |
| 5,647,546 A | 7/1997 | Sinovas et al. | |
| 5,836,684 A | 11/1998 | Safont et al. | |
| 5,863,118 A * | 1/1999 | Ackels | A47J 43/0711 366/129 |
| 6,293,691 B1 | 9/2001 | Rebordosa et al. | |
| 6,398,403 B1 | 6/2002 | Rebordosa et al. | |
| 8,038,338 B2 * | 10/2011 | Maleiro Vilarino | A47J 43/0705 366/601 |
| D652,679 S | 1/2012 | Haley et al. | |
| 10,258,200 B2 | 4/2019 | Wolf et al. | |
| 10,278,542 B2 | 5/2019 | Wolf et al. | |
| 2001/0008258 A1 * | 7/2001 | Robordosa | F25C 5/046 241/282.1 |
| 2008/0043569 A1 | 2/2008 | Moschetti | |
| 2013/0003489 A1 * | 1/2013 | Hoare | A47J 43/0727 366/129 |
| 2016/0015216 A1 * | 1/2016 | Egger | A47J 43/044 366/129 |
| 2018/0116464 A1 | 5/2018 | Wolf et al. | |
| 2020/0359840 A1 | 11/2020 | Li et al. | |

OTHER PUBLICATIONS

International Preliminary Report on Patentability of the International Searching Authority, dated Sep. 28, 2021, with respect to International Application No. PCT/EP2020/061153.
Search Report dated Apr. 11, 2022 in corresponding parallel Russian application No. 2021134358/03.

* cited by examiner

KITCHEN APPLIANCE AND ACCESSORY ELEMENT FOR SEALING A PROTECTIVE HOOD OF A KITCHEN APPLIANCE

TECHNICAL FIELD

The present invention relates to a kitchen appliance, preferably a hand-held kitchen appliance, for example a hand blender, and to an accessory element for sealing a protective hood of the kitchen appliance.

BACKGROUND OF THE INVENTION

Conventional implements for stirring or chopping foods are known, for example, from WO 96/10944 A1, EP 2 421 420 A1, EP 1 625 819 A1 or EP 0 724 857 A1. A wide variety of such implements is used, in particular in the daily preparation of foods, in order, for example, to chop and to mix foods. One type of implement are hand blenders, which are widely used domestically but also in professional catering enterprises.

Typically, hand blenders have a motor housing to which there is attached an elongate housing portion, the so-called shank, which in turn merges at its end into a protective hood, or shield, having an end that is open at the bottom, the so-called bell. In the motor housing there is arranged a drive motor, which drives a drive shaft guided through the shank and to the end of which there is conventionally fastened in the region of the bell a working part, for example a cutting blade in the form of a rapidly rotating blade, for mixing liquids and chopping solid foods.

The shank generally serves to adapt the motor housing to the shank assembly group and frequently to axially and radially mount the shaft, which is required for driving the working part. The bell has inter alia a protective function, in order to make it difficult for the user to reach the running blade. In addition, it serves to define a fixed distance between the blade and the base of a processing vessel (saucepan, stirring beaker, bowl, etc.), to optimize the flow around the working part, and as a splash guard when immersed in liquids. The bell is conventionally of such a size that it encloses the cutting blade and, when seen in the direction of the axis of the drive shaft, projects a certain distance beyond the end of the drive shaft, or the cutting blade. Such hand blenders or hand-held mixers often have food processors as an additional accessory, as shown, for example, in EP 1 625 819 A1, which can be driven by the motor housing instead of the shank.

As described, for example, in DE 100 33 032 C1 or EP 2 421 420 A1, a protective hood for a kitchen appliance that shields the working part covers the working part only partially in the circumferential direction and has cut-outs in between. As is known from DE 100 33 032 C1 or from EP 2 421 420 A1 and is thereby preferred, the protective hood is of wave-like form at its lower edge and is equipped at its lateral surfaces with outflow openings in the form of cut-outs. This configuration is to prevent foods from accidentally splashing out of the receiving vessel, but a continuous exchange of material to be processed between the outside and the inside of the bell is nevertheless to be made possible and suction of the kitchen appliance to the base of the processing vessel is to be prevented.

Such suction to the base of the processing vessel can be extremely troublesome for a user, because it requires an increased application of force to release the kitchen appliance from the base of the processing vessel. This suction is caused mainly by the use of the appliance in a processing vessel and by the position of the cutting blade inside the protective hood (bell) since the geometry of the working part that is expedient for the function causes a "propeller effect" in the liquid and effects suction of the entire lower region of the kitchen appliance, namely the bell with the working part arranged therein, to the base of the vessel.

In addition to the above-described configuration, DE 10 2015 207 196 B3 discloses in this respect a working part which is displaceable in the longitudinal direction of the shank and which, in the starting state, is seated deeper in the bell and thus acts against the "propeller effect" described above and reduces the splashing of liquid foods but, owing to the displaceability of the working part along the longitudinal axis of the shank, nevertheless achieves a good processing result. However, the splashing of foods from such a configuration can also not be prevented completely since openings are still required in the lateral surface of the bell.

Such kitchen appliances known hitherto having a partially open lateral surface can therefore be used only in deep processing vessels since these prevent the foods that splash out of the bell from also being able to splash out of the vessel. This happens if such an appliance is used in a shallow vessel or on a flat working surface.

They are likewise unsuitable or scarcely suitable for the processing of very small quantities, for example in the form of solid foods such as herbs, nuts, spices or the like, since these escape from the bell and can no longer be picked up by the blade.

The above configurations are also particularly disadvantageous when the kitchen appliance is being used, because additional elements, for example in the form of saucepans or deep vessels, are always necessary, which elements are required only for the processing of the foods and must additionally be cleaned after use, and the processing operation is thus prolonged significantly. This is very inefficient in particular when the quantities to be processed are very small.

For chopping smaller quantities, so-called food processor attachments are most suitable. However, the food processors from the prior art consist of multiple parts (bowl, blade, lid, optionally additionally plunger and removable gear unit), as shown by way of example in WO 2013/097702. These require a large cleaning effort and take up a large amount of storage space, which in the case of relatively small quantities to be processed bear no relation to the quantity of foods processed. Moreover, these food processors are often relatively large so that very small quantities likewise cannot be processed therein with a good result. Good results can be achieved only in very small food processors, although with the above-described disadvantages of the large number of individual parts.

EP 2 394 544 A1 discloses a hand-held kitchen appliance for processing foods, having a bell which is displaceable in the longitudinal direction of the shank, which eliminates some of those disadvantages. This bell has a planar lower end face which can be fixed at different positions in the longitudinal direction of the shank. As a result of the displaceable bell, it is possible to use the hand-held kitchen appliance not only as a normal hand blender but also in processing vessels of different depths. Although splashing is better suppressed owing to the absence of openings in the lateral surface of the bell, the appliance still cannot be used in shallow vessels or on a cutting board. Since the bell is manufactured from rigid plastics material, it cannot achieve ideal sealing against a flat base, in particular when the base is not ideally flat and rigid. At the same time, the fully closed bell shape is very unsuitable for operation as a normal hand blender since a poor exchange of the material to be processed and very pronounced suction to the base of the container are to be expected.

Moreover, U.S. D652 679 S discloses a flexible protective ring which is permanently fitted to a lower end of the bell or is removable and which serves to protect against scratches on the processing vessel. However, because this protective ring is also not adapted to the above-described openings in the lateral surfaces of the bell, the configuration of U.S. D652 679 S cannot prevent food from splashing out of the bell during food processing either. In other words, sealing between the bell and a processing vessel or a processing surface is likewise not disclosed in U.S. D652 679 S.

Moreover, US 2008/0043569 A1 discloses a hand-held kitchen appliance to which a flexible closure ring can be attached at the axial opening of the protective hood of the hand blender. With such a configuration too, food cannot be prevented from escaping from the protective hood since openings are here likewise disclosed in the protective hood, in order to ensure that suction of the kitchen appliance to the base of the processing vessel is avoided. The attachment is here also to serve as a spatula.

Furthermore, most hand blenders are supplied with such a shank (=blending attachment) as a standard accessory. This is provided mainly for processing liquid or pasty foods, for example for blending soups or smoothies. However, it would be desirable to be able to use this blending attachment also for the processing of small quantities of solid foods directly in the serving vessel since an owner of a hand blender often possesses this blending attachment in any case and an added benefit would thus be possible without an additional accessory. Moreover, the disadvantages described at the beginning (cleaning effort, required storage space) of the existing solutions could thus be avoided.

This is not possible for several reasons: All the shanks on the market have around the blade a bell-shaped protective hood which has lateral openings or cut-outs, as is to be seen, for example, in EP 1 065 963 A1. As already mentioned, these are necessary in order to permit an exchange between the space inside and outside the bell in the case of larger quantities and liquid foods, even when the blade is in the vicinity of the base of the vessel. In addition, suction of the blade to the base of the vessel is thus avoided or reduced.

However, in the case of direct use on a cutting board, the openings would result in considerable contamination in the near vicinity since the chopped material is able to escape from the bell at the sides. As a result of the high speeds of rotation of the blade, the chopped material moves at high speed through the openings out of the bell and is thus scattered in the kitchen. The chopped foods are thus no longer usable. In addition, the blade in such a case is situated at a certain distance above the cutting board so that it cannot pick up all the food.

DE 60 2006 000 858 T2 discloses the features of the preamble of claim 1. DE 197 50 813 A2 is further prior art.

DESCRIPTION OF THE INVENTION

Accordingly, it is an object of the present invention to provide a kitchen appliance, preferably a hand-held kitchen appliance, and an accessory element for sealing a protective hood of such a kitchen appliance, in which safe and reliable processing of foods inside the protective hood is ensured without additional elements, in particular in the form of processing vessels, and at least some of the above disadvantages can be reduced or even prevented. In particular, it is an object of the present invention to ensure complete sealing between the protective hood of the kitchen appliance and a surface on which the food to be processed is situated.

This object is achieved by a device having the features of claim 1 or 13. Preferred embodiments are to be found in the further claims.

According to one embodiment, the kitchen appliance for food processing has a drive shaft which is rotatably mounted and can be operatively connected to a motor of the kitchen appliance, and a working part, preferably having a blade, which is provided on the drive shaft. There is further provided on the kitchen appliance a protective hood having multiple cut-outs in the circumferential direction, which protective hood surrounds the working part in the circumferential direction of the rotation of the drive shaft, and an opening in the axial direction of the drive shaft. Moreover, the kitchen appliance, according to one embodiment, has a preferably cylindrical accessory element which can be removed from and attached to the protective hood without a tool, wherein the accessory element has an outer body having a first axial end face and having a second, opposite axial end face remote from the protective hood, and wherein the protective hood, by cooperation with the accessory element, defines a cavity for processing foods which is closed in the circumferential direction of the protective hood. The outer body additionally has preferably multiple, preferably three, yet more preferably six, protrusions projecting inwards in the radial direction, which protrusions can be operatively connected to the cut-outs in the protective hood of the kitchen appliance.

A "cavity" is understood in this context as being a closed region inside the protective hood of the kitchen appliance so that foods can be prevented from escaping to the outside during processing. That is to say, as a result of the cooperation of the protective hood with the accessory element, a space for processing foods that is closed in the circumferential direction of the protective hood is formed, which space is so sealed that food that is being processed by the kitchen appliance can be prevented from splashing out. The form of the accessory element can thereby be configured flexibly, and it is sufficient that the accessory element is so configured that the protective hood is closed completely in the circumferential direction. That is to say, the opening in the protective hood in the axial direction can be held against a worktop, for example, and thus closed, while the opening (s) and/or cut-out(s) arranged in the circumferential direction of the protective hood are likewise closed completely as a result of the cooperation of the accessory element and the protective hood.

The term "protective hood" can also be interpreted in the same manner as the term "bell" which is conventional in the field of cooking and gastronomy, which serve to protect a user from reaching the working part. Furthermore, a fixed distance between the working part and a surface on which the food to be processed is situated can be defined by this protective hood (bell).

There can be used as foods in such an embodiment, for example, in particular small quantities of foods which must or should not be stored or processed in a large saucepan or the like, for example garlic cloves, nuts, spices or the like.

As a result of the cooperation of the protective hood with the accessory element, reliable splash protection can thus be achieved. Furthermore, the above-described small quantities of foods can thus be processed directly beneath the protective hood, without moving the accessory element or requiring a special vessel adapted to the working part. The working space defined by the protective hood and the accessory element is thereby closed at the bottom by any desired vessel or even a surface (for example plate, cutting board, bowl, container or the like) in which the food is subsequently to be served, stored or further processed. Accordingly, it is no longer necessary to dirty special vessels specifically for processing the foods, which vessels are then no longer required further. Since the small quantity of the foods to be processed fits completely into the working space of the protective hood, which is enclosed in the circumferential direction by the accessory element, an opening is also no longer required in the protective hood via which an exchange of material to be processed inside and outside the protective hood can take place. Since such an embodiment is directed in the present invention in particular to the processing of small quantities or pasty foods without additional vessels or the like, a suction effect (propeller effect) or the like is likewise less marked, or is not relevant, since the kitchen appliance does not have to be moved during processing.

In addition, as a result of the connection of the accessory element to the protective hood, it is ensured by the protrusions projecting inwards in the radial direction that the accessory element can be attached to the kitchen appliance quickly, simply and accurately in terms of position, and a cavity for processing foods that is closed completely in the circumferential direction can thus be achieved. It is particularly preferred here to use three or, more preferably, to use six protrusions projecting inwards in the radial direction.

The expression "in the radial direction" is to be understood as meaning that the protrusions, for example in the form of lugs, engage, for example inwardly, into the cut-outs in the protective hood of the kitchen appliance and thus define the position of the accessory element relative to the protective hood.

This is particularly advantageous since the kitchen appliance can thus be used not only as a "normal" hand blender, in which an exchange is also possible through the cut-outs arranged in the circumferential direction in the protective hood, but, as a result of the accessory element, the processing of small quantities of foods solely inside the protective hood closed by the accessory element, or the processing of liquids, is also additionally made possible. This broadens the field of use of the kitchen appliance of the present embodiment without significantly increasing the costs, the cleaning effort or the space requirement, as is the case in the solutions described at the beginning.

In other words, the idea underlying the invention is to achieve reliable sealing of the protective hood, without additional vessels or the like, by cooperation with the accessory element, in order thus to be able to process even liquid or pasty ingredients, and to prevent the foods from splashing out of the protective hood.

According to a further aspect, the accessory element can be removed from and attached to the protective hood by a force-fit, preferably via frictional engagement, or by an interlocking connection.

This makes it possible for the accessory element to be attached to the protective hood quickly, simply and without additional devices or means, and a closed cavity in the circumferential direction for processing, for example, small quantities of foods inside the protective hood with such a kitchen appliance is thus made possible.

According to a further aspect, the outer body is so configured that it opens in a funnel shape towards the first end face.

According to such an embodiment, it is possible that simple centering of the protective hood on connection of the accessory element to the protective hood can be ensured and positioning is thus ensured simply and precisely.

According to a further aspect, the outer body is so configured that it opens in a funnel shape towards the second end face.

According to such an embodiment, it is possible to ensure that the food to be processed can simply be placed inside the protective hood and thus, where possible, all the food to be processed can be received inside the protective hood.

According to a further aspect, the second end face of the outer body is planar.

The term "planar" is here understood as meaning that this second end face of the outer body can be pressed against a flat surface, for example of a kitchen table or of a worktop, and the interior of the protective hood is then sealed so that food that is being processed by the kitchen appliance can be prevented from splashing out. Accordingly, not only the opening arranged in the axial direction but also the cut-outs in the protective hood that are arranged in the circumferential direction are closed.

According to a further aspect, the outer body has at the second end face a continuous, resilient and planar sealing lip.

This makes it possible to ensure, on slightly uneven or rough surfaces, for example the bases of saucepans, that no food can escape from the protective hood to the outside during processing. It is thus possible during processing of the foods to provide, for example, a seal between the protective hood in a bowl or a seal between the protective hood and a cutting board by means of the radially inwardly projecting lugs of the accessory element.

In addition to the processing of foods on surfaces that are not completely flat, as described above, it is possible with such an embodiment also to process small quantities of liquid or pasty ingredients, for example salad dressings or dips, with the kitchen appliance directly in the serving vessel (for example a shallow salad bowl) without the risk of splashing.

According to a further aspect, the outer body is of resilient form at least in some regions.

This makes it possible to ensure that a reliable seal is still achieved between a surface on which the food to be processed is situated and the protective hood by means of the accessory element of the kitchen appliance in the case of slight inclinations of the kitchen appliance about the axial direction or in the case of a slightly circular movement of the kitchen appliance by the user.

According to a further aspect, the outer body consists of resilient polymer material.

According to such an embodiment too, it is possible to ensure a permanent and secure seal between a surface on which the food to be processed is situated and the accessory element.

According to a further aspect, the protrusions are so arranged that they come into engagement with the cut-outs in the protective hood in such a manner that the second end face of the accessory element projects from the protective hood in the axial direction of the protective hood.

That is to say, with such an embodiment, it is ensured that the accessory element projects from the axial end of the protective hood and thus comes into contact with the surface on which the food to be processed is situated. It is thereby preferred that the outer surface is of continuous and planar form so that the second end face of the accessory element provides a complete seal with respect to a surface on which the food to be processed is situated. Furthermore, it is possible according to such an embodiment to ensure that there is no damage to the base area (for example a coated pan or a cutting board) on which the foods to be processed with the kitchen appliance are situated. Furthermore, it is thereby possible to prevent damage to the working part through contact with a processing vessel.

According to a further aspect, the working part is mounted so as to be axially movable inside the protective hood in the axial direction of the drive shaft.

According to such an embodiment, it is possible to reduce the "propeller effect" described above and the suction of the kitchen appliance to the base, for example a surface of a saucepan or a cutting board, achieved thereby. In addition, by means of an axial pressure exerted by the user, the working part can thereby be brought closer to the working surface, for example worktop, cutting board, base of a bowl, at the lower end of the protective hood, and the food processing result can thus be improved. In particular, as large a proportion as possible of the foods to be processed inside the protective hood is thereby reached and processed by the working part. Furthermore, the connection between the accessory element and the protective hood ensures that nothing can escape to the outside. In other words, the user thus has the possibility, during operation, to actively change the axial position of the working part inside the protective hood, which is closed completely in the circumferential direction, and thus to enlarge the processing space of the working part inside the protective hood.

It is preferred in this context that the working part does not project beyond the axial end of the protective hood in any possible axial position. This results in increased safety of the kitchen appliance and prevents the working part from being able to come into contact with the surface on which the food to be processed is situated and damaging it.

According to a further aspect, an accessory element for sealing a protective hood of a kitchen appliance is disclosed, wherein the accessory element is suitable for use in a kitchen appliance according to one of the preceding aspects. It can be used in conjunction with a blending attachment, in particular a blending attachment as described in DE 10 2015 207 196 B3. As a result, only a very small and cost-efficient accessory part is necessary in order to be able to use the blender for the above-described application. The accessory element is fitted to the attachment from beneath. As a result of the flexible material, the attachment can adapt very well to the bell and compensate for tolerances. The attachment thus closes off to the outside the openings of the cut-outs or openings that are otherwise necessary for the exchange of the foods so that chopping can be carried out directly on the cutting board or other surfaces without a container. This is very expedient in particular for small quantities, simplifies use and minimizes the subsequent cleaning effort. Moreover, the flexible material of the attachment serves as a seal for holding foods containing a large amount of liquid (e.g. onions) in the bell and minimizing splash. Furthermore, by means of the accessory element, chopping, mixing and blending can also be carried out locally in viscous products for processing.

The accessory element of a flexible material is able to chop hard and soft foods without a container and is used especially for small quantities, since it is ready for use quickly and can be cleaned easily and at the same time quickly. It is a geometrically adaptable attachment which can compensate for manufacturing tolerances of the bell. The centrally located, cylindrical geometries which may be present on the inner sides of the accessory element fit into the lower cut-outs in the bell developed for the exchange of foods so that further riding up on the bell is prevented. The potential flexible position of the blade in the bell serves as an advantage for effectively chopping small quantities of foods completely. If this attachment were to be used for other shanks, certain residues of the chopped material that could not be chopped would always be left behind since the position of the blade in the bell could not be changed.

BRIEF DESCRIPTION OF THE DRAWINGS

A Kitchen Appliance, Preferably a Hand-Held Kitchen Appliance, for Food Processing and an Accessory Element for Sealing a Protective Hood of Such a Kitchen Appliance are Illustrated Hereinbelow by Means of Schematic Drawings, in which.

DESCRIPTION OF THE PREFERRED EMBODIMENT

A kitchen appliance for food processing and an accessory element for sealing a protective hood of such a kitchen appliance according to an exemplary embodiment will be described hereinbelow with reference to schematic drawings.

In the schematic view shown in FIG. 1 of an accessory element 10 for sealing a protective hood of a kitchen appliance described hereinbelow, a star-shaped outer body 11 of the accessory element 10 is shown. Other basic forms of the accessory element 10 are, however, likewise possible. By way of example, mention is made here of a circular or elliptical accessory element. The decisive factor therefor is the shape of the protective hood on which the accessory element is to be used.

Figure 1:
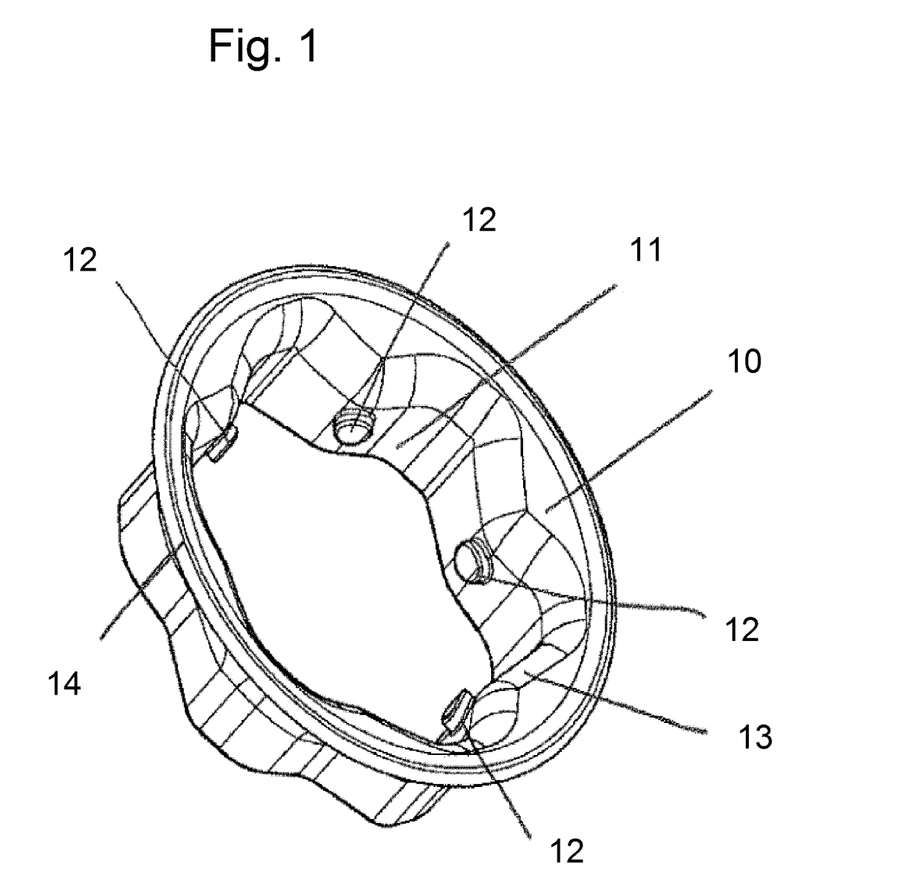
FIG. 1: is a schematic illustration of an accessory element for sealing a protective hood of a kitchen appliance.

In the exemplary embodiment of such an accessory element shown in FIG. 1, the outline of the outer body 11 additionally corresponds to the outline of the protective hood of the kitchen appliance to which the accessory element can be fitted.

Moreover, a plurality of protrusions 12 is arranged on the inner side of the outer body, that is to say on the side of the outer body that is directed inwards in the radial direction. In the exemplary embodiment, the protrusions 12 are in each case arranged at the innermost position, in the radial direction, along the circumference of the outer body 11.

Moreover, the protrusions 12 of the accessory element 10 are so arranged in the circumferential direction of the outer body 11 that they come into engagement with cut-outs 21, described hereinbelow, in the protective hood 20 and can be operatively connected therewith in such a manner that they define a cavity for processing foods that is closed in the circumferential direction.

As is better visible in FIG. 3 and described in greater detail hereinbelow, the protrusions 12 are so arranged in the axial direction of the outer body 11 that a second end face 15 of the accessory element 10 projects from the protective hood 20 in the axial direction. Other arrangements of the protrusions 12 on the inner surface of the outer body 11 are likewise possible. For example, the protrusions 12 can be so arranged that the second axial end face 15 is flush with the axially lowermost point of the protective hood 20.

According to a further embodiment, not shown, it is possible that the protrusions 12 are arranged on an outer side of the outer body 11 so that the accessory element projects completely into the protective hood 20 of the kitchen appliance.

Figure 2:
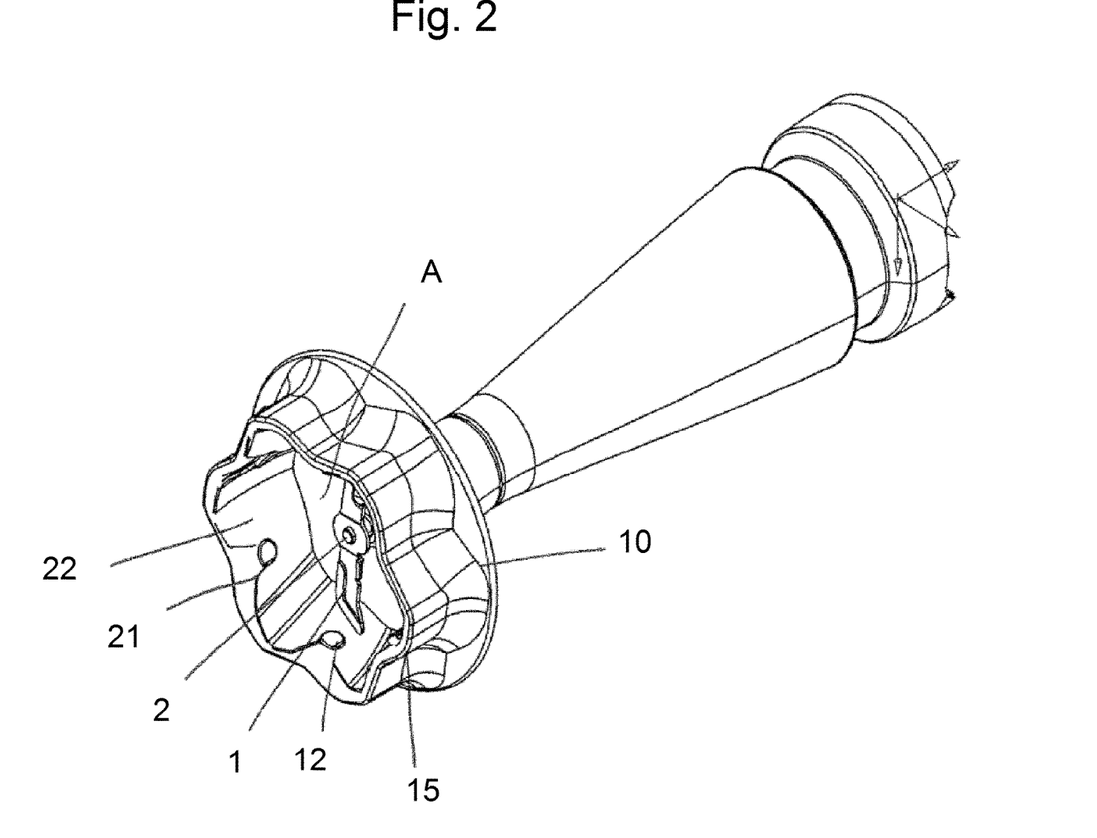
FIG. 2: is a schematic partial illustration of a kitchen appliance for food processing having an accessory element according to FIG. 1.

Furthermore, a first axial end face 14, which faces the protective hood 20 of the kitchen appliance, is provided with a funnel shape 13 according to the embodiment shown so that simpler positioning of the accessory element 10 on the protective hood 20 can be ensured. FIG. 2 shows a schematic illustration of a bottom portion of a kitchen appliance for food processing according to an exemplary embodiment having the accessory element 10 known from FIG. 1 and already described. In the exemplary embodiment, a drive shaft 2 is radially mounted in the kitchen appliance. Mounting takes place via a bearing, not shown, which allows the drive shaft 2 to rotate at least in the circumferential direction of the drive shaft 2. The bearing can be configured both as a slide bearing and as a ball bearing. The bearing (not shown) can also be used to absorb axial forces.

On the drive shaft 2 there is provided a working part 1, which in the preferred embodiment in FIG. 2 is a blade. In the embodiment shown, the blade is provided at a longitudinal end of the drive shaft. A configuration with a blade 1 spaced apart from the longitudinal end of the drive shaft 2 is, however, likewise possible. The connection between the drive shaft 2 and the blade 1 is achieved in the embodiment shown in FIG. 2 by means of a non-releasable interlocking coupling connection. A releasable coupling connection (not shown) is also conceivable at this point. This means that the blade 1 can be released from the drive shaft by the coupling connection. This is particularly advantageous when the kitchen appliance, here a hand blender, is to be cleaned and the blade 1 is to be removed from the kitchen appliance.

At the other, upper longitudinal end of the drive shaft 2, a motor, or drive, can be connected to the drive shaft (not shown). A rotational force of the motor (not shown) can thus be transmitted to the drive shaft. Consequently, the rotation of the blade 1 can be controlled by a controller of the motor via a drive shaft. An interposed transmission in the form of a gear unit between the motor and the drive shaft 2 is also conceivable.

As is apparent from FIG. 2, it is possible, as a result of the cooperation of the protective hood 20 of the kitchen appliance and the accessory element 10, to achieve a cavity A for processing foods therein that is closed completely in the circumferential direction of the protective hood 20.

In this respect, the protective hood 20 of the kitchen appliance will be described in greater detail with reference to FIG. 3.

Figure 3:
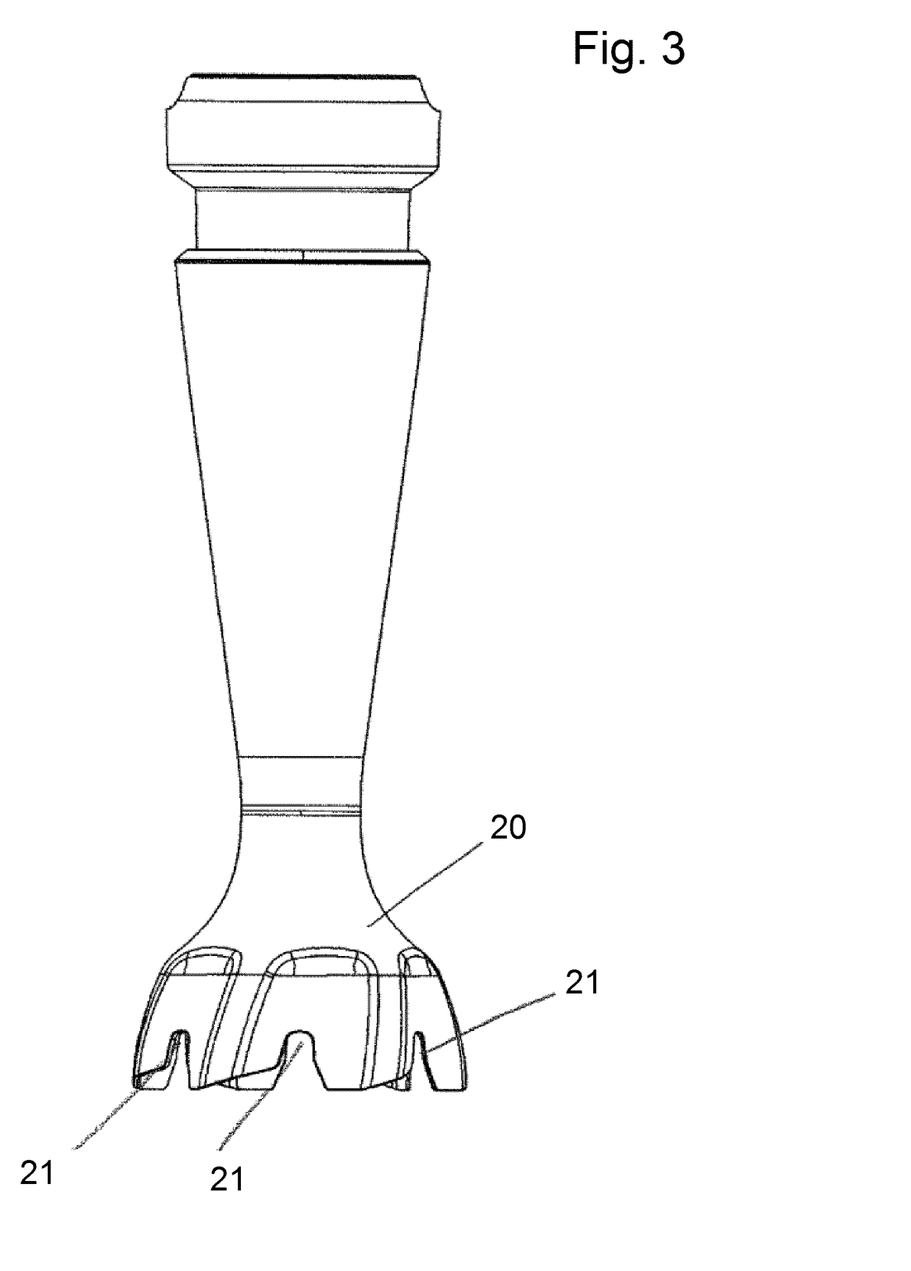
FIG. 3: is a schematic partial side view of the kitchen appliance for food processing according to FIG. 2 without the accessory element shown in FIG. 1.

As is apparent from FIG. 3, the protective hood 20 is arranged at the lower longitudinal end, that is to say in the axial direction of the kitchen appliance. This protective hood 20 surrounds the blade 1 in the direction of rotation of the blade 1 and thus ensures that a user cannot reach the blade 1 from above or from the side. The protective hood, as is apparent from FIGS. 2 and 3, is so configured that, on the one hand, it always projects further in the longitudinal direction than the working part (the blade 1) and, on the other hand, it has cut-outs 21 in the circumferential direction of the protective hood 20 so that suction of the protective hood to a surface, for example to a saucepan, can be reduced, when the kitchen appliance is being used without the accessory element 10. The processing of foods, for example in the preparation of soups, can thus be ensured through the entry and exit of foods into and out of the protective hood.

As is shown in FIG. 3, the diameter of the protective hood 20 increases towards the lower longitudinal end. The protective hood can thus easily be positioned over the foods to be processed and/or over a vessel in which foods to be processed are situated. Moreover, the protective hood has an opening 22 in the longitudinal direction, which in the preferred embodiment shown in FIGS. 2 and 3 corresponds to the largest inside diameter of the protective hood 20, that is to say to the lower longitudinal end of the protective hood 20.

The accessory element 10 is fitted to this opening 22, as shown in FIG. 2. It is apparent from FIG. 2 that no additional elements in the form of structural features are necessary for fitting the accessory element 10 to the protective hood 20, but rather a connection is achieved by cooperation of the protrusions 12 projecting inwards in the radial direction with the cut-outs 21 in the protective hood 20. In the preferred embodiment shown in FIGS. 1 to 3, the accessory element 10 is formed from a resilient polymer material which is brought into contact with the protective hood in such a manner that it can be removed or fitted via an interlocking connection, in particular by frictional engagement. The funnel shape 13 of the outer body 11 at the first axial end of the accessory element permits simple positioning and mounting of the accessory element.

Moreover, the cut-outs 21 are likewise v-shaped so that the protrusions 12, projecting inwards in the radial direction, of the accessory element can easily be positioned in the end position in the cut-outs 21 in the protective hood 20 of the kitchen appliance.

Moreover, the fact that the accessory element is formed from a resilient polymer material can have the effect that, by means of the accessory element, reliable sealing of the cavity A inside the protective hood that is reliable even in the case of unevenness or movements by the user can be ensured. Thus, in addition to the use of the kitchen appliance for chopping larger quantities of foods through the cut-outs 21, a completely closed cavity A inside the protective hood can also be achieved by means of the accessory element 10 so that smaller quantities can also be processed inside the accessory element without the risk of splashing or the escape of foods to be processed.

The accessory element consisting of a resilient polymer material projects in the axial direction from the end face of the protective hood 20. This has the result that the second end face 15 of the accessory element 10 comes into contact with a counter-element, for example with a working surface or a cutting board, during the processing of foods. The resilient accessory element 10 is thus able to seal the protective hood 20 together with the cut-outs 21 from the external environment in the circumferential direction so that reliable processing of the foods without the risk of splashes or the escape of liquids or food portions is possible. The second axial end face 15 of the accessory element 10 is thereby formed completely at the axially lower end face of the protective hood 20 in a circumferential manner, and the protective hood covers all the cut-outs in the circumferential direction of the protective hood 20. Thus, not only lateral sealing but also sealing in the case of uneven contact surfaces, for example warped cutting boards, is ensured.

The term "resilient" means that the accessory element 10 can be deformed without plastic deformation and can be resiliently deformed by the user in that the user applies pressure to the accessory element in the longitudinal and/or transverse direction and thus achieves secure and reliable sealing of the accessory element, or of the protective hood 20, of the kitchen appliance. If the accessory element for a kitchen appliance is no longer required once foods have been processed, the user can release the pressure on the kitchen appliance having the accessory element again, so that the resilient accessory element 10 can resume its shape and, by lifting of the kitchen appliance, the foods which have been processed inside the protective hood 20 by the kitchen appliance, in particular the blade 1, appear again.

According to a further embodiment, not shown, of the kitchen appliance for food processing, the blade 1 is mounted so as to be axially movable inside the protective hood 20 in the longitudinal direction of the drive shaft 2. The blade 1 can thus be moved in the axial direction of the kitchen appliance. In order to guide the blade 1 to a bottom position, force is applied to the kitchen appliance in the axial direction from outside by the user. In other words, the blade can be moved in the longitudinal direction of the drive shaft 2 in the axial direction inside the protective hood 20 by externally applied forces. This axial movement of the blade 1 relative to the protective hood 20 is made possible, for example, via a spring element, not shown, or a damping element inside the kitchen appliance. Thus, after removal of the external force by the user, the blade 1 always moves in the axial direction of the kitchen appliance back to the home position again.

According to a further embodiment, the second axial end face 15 of the accessory element 10 can also be funnel-shaped so that easier positioning on the foods to be processed can be made possible. Moreover, by means of a funnel-shaped configuration of the second axial end face 15, uneven processing surfaces and a non-optimal angular position relative to the bearing surface when using the working part can be dealt with and compensated for in an improved manner.

The invention claimed is:

1. A kitchen appliance for food processing, comprising
    a drive shaft, which is rotatably mounted and can be operatively connected to a motor of the kitchen appliance,
    a working part, comprising a blade, which is provided on the drive shaft,
    a protective hood having multiple cut-outs in a circumferential direction, which protective hood surrounds the working part in a circumferential direction of rotation of the drive shaft and has an opening in an axial direction of the drive shaft; and
    a cylindrical accessory element, which can be removed from and attached to the protective hood without a tool,
    wherein the accessory element comprises an outer body having a first axial end face and a second, opposite axial end face remote from the protective hood, and
    wherein the protective hood, by cooperation with the accessory element, defines a cavity for processing foods which is closed in a circumferential direction of the protective hood and open in a lower axial direction.

2. The kitchen appliance according to claim 1, wherein the outer body of the accessory element comprises multiple, protrusions projecting inwards in a radial direction, which protrusions can be operatively connected to the cut-outs in the protective hood.

3. The kitchen appliance according to claim 1, wherein the accessory element can be removed from and attached to the protective hood by a force-fit frictional engagement or by an interlocking connection.

4. The kitchen appliance according to claim 1, wherein the outer body of the accessory element is so configured that it opens in a funnel shape towards the first end face.

5. The kitchen appliance according to claim 1, wherein the outer body of the accessory element is so configured that it opens in a funnel shape towards the second end face.

6. The kitchen appliance according to claim 1, wherein the second opposite axial end face of the outer body is planar.

7. The kitchen appliance according to claim 1, wherein the outer body of the accessory element at the second end face further comprises a continuous, resilient and planar sealing lip.

8. The kitchen appliance according to claim 1, wherein the outer body of the accessory element is of resilient form at least in some regions.

9. The kitchen appliance according to claim 1, wherein the outer body of the accessory element consists of resilient polymer material.

10. The kitchen appliance according to claim 2, wherein the protrusions are so arranged that they come into engagement with the cut-outs in the protective hood in such a manner that the second end face of the accessory element projects from the protective hood in an axial direction of the protective hood.

11. The kitchen appliance according to claim 1, wherein the working part is mounted so as to be axially movable inside the protective hood in an axial direction of the drive shaft.

12. The kitchen appliance according to claim 11, wherein the working part is so mounted that it does not project beyond the axial end of the protective hood in an axial position.

13. The kitchen appliance of claim 2, wherein the accessory element comprise three protrusions.

14. The kitchen appliance of claim 2, wherein the accessory element comprise six protrusions.

* * * * *